J. H. GRAVELL & G. D. FARWELL.
PICTURE EXHIBITION DEVICE.
APPLICATION FILED NOV. 1, 1907.

900,522.

Patented Oct. 6, 1908.
2 SHEETS—SHEET 2.

WITNESSES:
Percy C. Farwell
Carrie L. Herrick

INVENTORS
James H. Gravell
George D. Farwell
BY
Paul Synnestvedt
ATTORNEY

UNITED STATES PATENT OFFICE.

JAMES H. GRAVELL, OF PHILADELPHIA, PENNSYLVANIA, AND GEORGE D. FARWELL, OF BRIDGEPORT, CONNECTICUT, ASSIGNORS OF ONE-THIRD TO PERCY C. FARWELL, OF BRIDGEPORT, CONNECTICUT.

PICTURE-EXHIBITION DEVICE.

No. 900,522.     Specification of Letters Patent.     Patented Oct. 6, 1908.

Application filed November 1, 1907. Serial No. 400,306.

*To all whom it may concern:*

Be it known that we, JAMES H. GRAVELL and GEORGE D. FARWELL, of Philadelphia, Pennsylvania, and Bridgeport, Connecticut, respectively, citizens of the United States, have invented a new and useful Picture-Exhibition Device, of which the following is a specification.

This invention has reference to a combined auto vehicle and picture exhibition device, and has for its primary objects the provision of means whereby a transportation vehicle is combined with a picture exhibition device, and a motor common to the vehicle and exhibition device whereby through the instrumentality of said additional means, the same motor may be employed for actuating the vehicle, and also the picture exhibition device, and whereby also the vehicle and the picture exhibition device may be operated in alternation if desired, or, if preferred, may be caused to operate together, without interfering, the one with the other.

A further object of this invention is the provision of an exhibition device secured to the vehicle above referred to, in the form of a trailer in certain relation to the picture exhibition device, whereby pictures or advertising matter may be exhibited on the said exhibition trailer as the vehicle is progressing along the street or highway.

The above, as well as other objects which will hereinafter appear, we attain by means of the construction which we have illustrated in preferred form in the accompanying drawings wherein—

Figure 1:
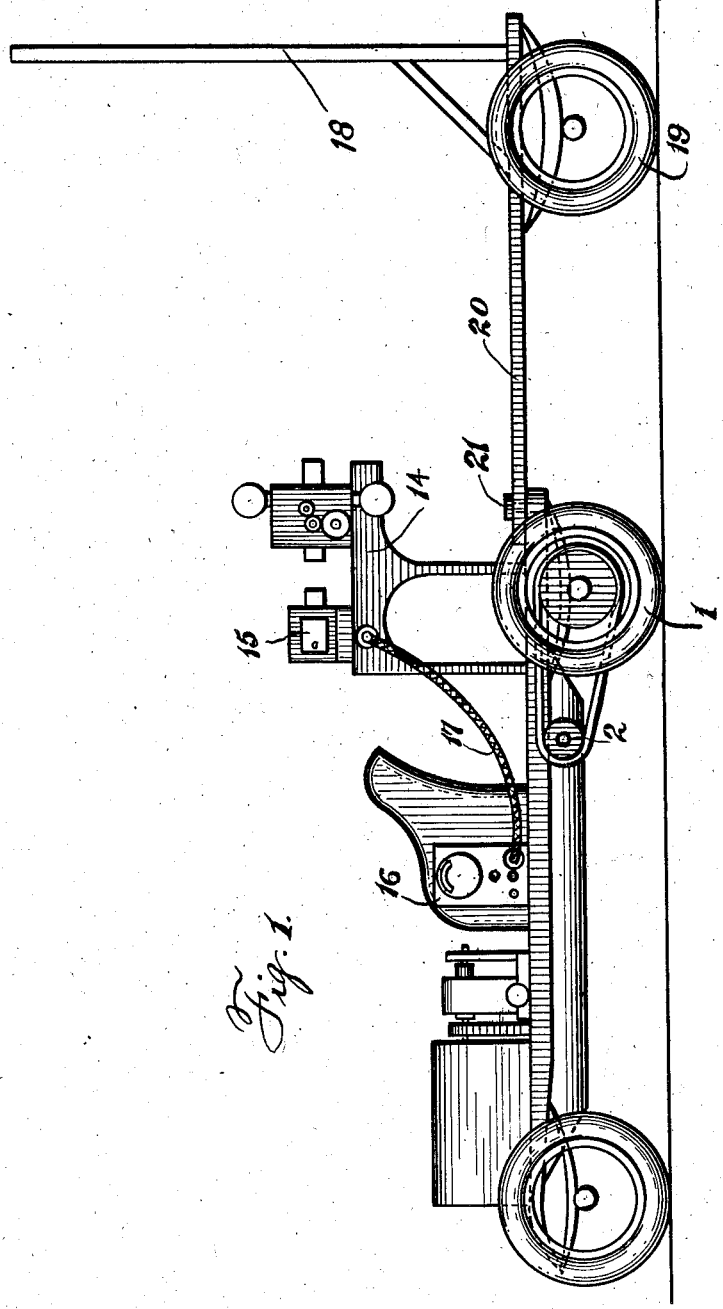
Figure 2:
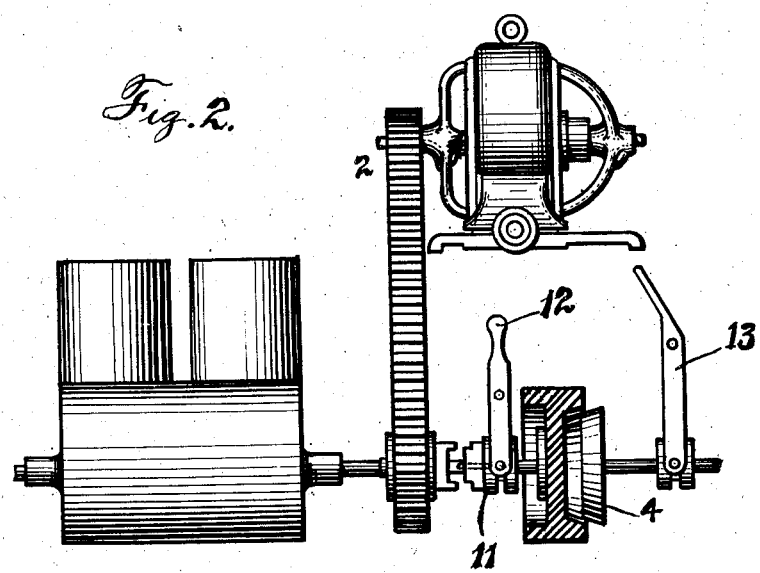
Figure 3:
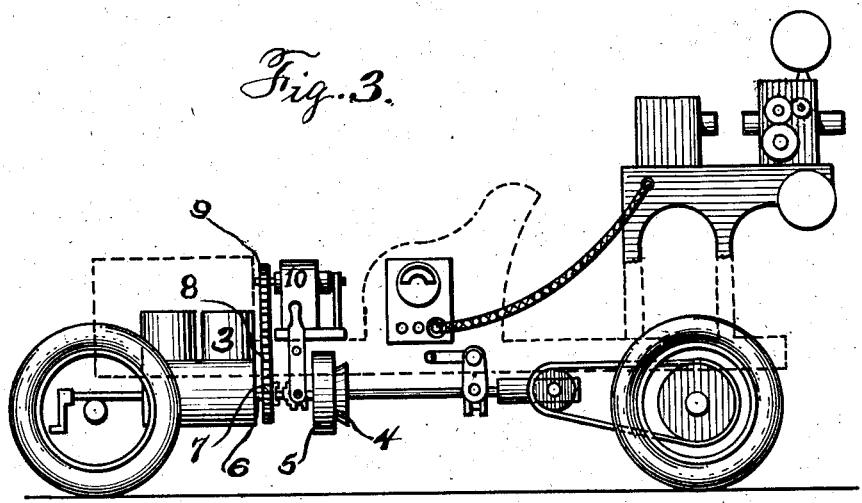

Figure 1 shows in side elevation an apparatus embodying our improvement;

Figure 2 indicates certain details of the mechanism employed in connection with such improvement, and Figure 3 is another view, in side elevation, of a part of the apparatus, indicating certain of the operative parts shown in Figure 2, as applied to the vehicle indicated in side elevation in Figure 1.

Referring now more particularly to Figures 1 and 3 it will be seen that we have therein shown a self-propelled vehicle or automobile having a pair of driving wheels indicated at 1, constructed to be driven in any ordinary or preferred manner as by the counter shaft 2, from a driving motor 3, through the instrumentality of a clutch device 4 adapted to be engaged or disengaged at will with the balance wheel 5.

Upon the motor shaft 6 is mounted a loose gear or chain wheel 7 which by means of a chain 8 is arranged to drive a gear 9 carried upon the shaft of a generator 10, the actuation of the generator being secured when the positive clutch 11 (see Figure 2) is thrown into action by means of the hand lever 12. The friction clutch 4 is constructed to be actuated by the lever 13, and as shown, may be thrown into engagement at the same time as the positive clutch 11, or alternately therewith.

Referring now again to Figures 1 and 3, it will be seen that upon the rear of the vehicle, in any preferred place or manner, we mount the picture exhibiting device which may be of any preferred or known construction, indicated at 14, and which is provided with an electric lighting apparatus such as is ordinarily used—diagrammatically represented at 15—and connected with a governing switch-board 16 by means of a flexible cable 17 as shown. The switch-board 16 is connected to the generator in the usual manner, and by the usual connections.

It is evident that by the use of a longer flexible cable 17 the picture exhibiting device indicated at 14 may be placed inside of a building, with the vehicle outside, and the engine of the vehicle utilized to generate the current for the light in the exhibition of the pictures.

It may occur that it is desired to have the exhibition screen 18 carried with the vehicle in position where it may be used while the vehicle is in motion, in which case we have made provision by mounting the screen as shown, upon a truck 19 provided with a baseboard or frame 20 pivotally secured at 21 to the automobile or self-propelled vehicle, forming thus a trailer means which may be used in the place indicated or elsewhere, as desired.

By the arrangement shown it will be evident that we have made it possible to exhibit moving picture devices and other like exhibitions by means of electric light, in places such as halls which are not connected with any electric light supply, or in small towns and villages where no such supply of electricity is available and where the common practice is to make exhibitions of this character with the use of gas tanks shipped around from place to place, or by other means which may be cumbersome or expensive. It is also evident that by this improved apparatus we have provided a means for utilizing the same motor for propelling a vehicle and for actuating a picture exhibition device with instrumentalities suitably constructed to operate, so that the said mechanisms and devices can be used in alternation or conjointly, as desired.

Having thus described our invention and illustrated its use, what we claim as new and desire to secure by Letters Patent, is the following:

1. The combination of a self-propelled vehicle, a motor therefor, an electric generator, means for transmitting power from the motor to the generator, a picture exhibition outfit, and means for connecting the generator and picture exhibition outfit, with mechanism whereby the same motor is utilized for propelling the vehicle and for driving the generator, substantially as described.

2. The combination with a self-propelled vehicle, of an exhibition screen trailer therefor, and means carried by the vehicle whereby pictures may be thrown upon the screen, substantially as described.

3. The combination with a self-propelled vehicle, its motor and a picture exhibition apparatus, of clutch mechanism whereby said motor may be caused to actuate the self-propelled vehicle or the picture exhibition mechanism at will, substantially as described.

In testimony whereof we have hereunder signed our names in the presence of the subscribed witnesses.

J. H. GRAVELL.
GEORGE D. FARWELL.

Witnesses as to J. H. Gravell:
F. H. HICKS,
M. PRATT.

Witnesses as to George D. Farwell:
R. G. ASHMAN,
WM. M. JONES.